(12) United States Patent
Manssen et al.

(10) Patent No.: US 8,472,888 B2
(45) Date of Patent: Jun. 25, 2013

(54) METHOD AND APPARATUS FOR CALIBRATING A COMMUNICATION DEVICE

(75) Inventors: Keith R. Manssen, Bull Valley, IL (US); Dan Boire, Nashua, NH (US); Matthew R. Greene, Crystal Lake, IL (US)

(73) Assignee: Research In Motion RF, Inc., Wilmington, DE (US)

( * ) Notice: Subject to any disclaimer, the term of this patent is extended or adjusted under 35 U.S.C. 154(b) by 777 days.

(21) Appl. No.: 12/547,411

(22) Filed: Aug. 25, 2009

(65) Prior Publication Data
US 2011/0053524 A1 Mar. 3, 2011

(51) Int. Cl.
*H04B 1/40* (2006.01)
(52) U.S. Cl.
USPC ............ 455/77; 455/120; 455/160.1
(58) Field of Classification Search
USPC ............ 455/195.1, 424, 425, 456, 5, 456.6, 455/561, 550.1, 575.1, 82, 133, 67.14, 123, 455/178.1, 77, 87, 120, 160.1; 333/17.3, 333/32, 246; 343/860, 850, 861, 855; 340/572.1
See application file for complete search history.

(56) References Cited

U.S. PATENT DOCUMENTS

| | | | |
|---|---|---|---|
| 2,745,067 A | 5/1956 | True | |
| 3,117,279 A | 1/1964 | Ludvigson | |
| 3,160,832 A | 12/1964 | Beitman | |
| 3,390,337 A | 6/1968 | Beitman | |
| 3,443,231 A | 5/1969 | Roza | |
| 3,509,500 A | 4/1970 | McNair | |
| 3,571,716 A | 3/1971 | Hill | |
| 3,590,385 A | 6/1971 | Sabo | |
| 3,601,717 A | 8/1971 | Kuecken | |
| 3,794,941 A | 2/1974 | Templin | |

(Continued)

FOREIGN PATENT DOCUMENTS

| DE | 19614655 | 10/1997 |
|---|---|---|
| DE | 102008050743 | 4/2010 |

(Continued)

OTHER PUBLICATIONS

Hyun, S. , "Effects of strain on the dielectric properties of tunable dielectric SrTiO3 thin films", Applied Physics Letters, 2004 American Institute of Physics.

(Continued)

*Primary Examiner* — Nhan Le
(74) *Attorney, Agent, or Firm* — Guntin & Gust, PLC; Andrew Gust

(57) ABSTRACT

A system that incorporates the present disclosure may include, for example, a computer-readable storage medium having computer instructions to perform actual measurements of one or more performance parameters of a communication device according to a subset of tuning states of a tunable matching network operable in a communication device, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the data sets one or more tuning states that achieve at least one desirable performance characteristic of the communication device. Additional embodiments are disclosed.

30 Claims, 9 Drawing Sheets

U.S. PATENT DOCUMENTS

| | | | |
|---|---|---|---|
| 3,919,644 A | 11/1975 | Smolka | |
| 3,990,024 A | 11/1976 | Hou | |
| 3,995,237 A | 11/1976 | Brunner | |
| 4,186,359 A | 1/1980 | Kaegebein | |
| 4,201,960 A | 5/1980 | Skutta | |
| 4,227,256 A | 10/1980 | O'Keefe | |
| 4,383,441 A | 5/1983 | Willis | |
| 4,476,578 A | 10/1984 | Gaudin | |
| 4,493,112 A | 1/1985 | Bruene | |
| 4,777,490 A | 10/1988 | Sharma | |
| 4,799,066 A | 1/1989 | Deacon | |
| 4,965,607 A | 10/1990 | Wilkins | |
| 5,032,805 A | 7/1991 | Elmer | |
| 5,142,255 A | 8/1992 | Chang | |
| 5,177,670 A | 1/1993 | Shinohara | |
| 5,195,045 A | 3/1993 | Keane | |
| 5,200,826 A | 4/1993 | Seong | |
| 5,212,463 A | 5/1993 | Babbitt | |
| 5,243,358 A | 9/1993 | Sanford | |
| 5,258,728 A | 11/1993 | Taniyoshi | |
| 5,276,912 A | 1/1994 | Siwiak | |
| 5,301,358 A | 4/1994 | Gaskill | |
| 5,307,033 A | 4/1994 | Koscica | |
| 5,310,358 A | 5/1994 | Johnson | |
| 5,312,790 A | 5/1994 | Sengupta | |
| 5,334,958 A | 8/1994 | Babbitt | |
| 5,371,473 A | 12/1994 | Trinh | |
| 5,409,889 A | 4/1995 | Das | |
| 5,427,988 A | 6/1995 | Sengupta | |
| 5,430,417 A | 7/1995 | Martin | |
| 5,446,447 A | 8/1995 | Carney | |
| 5,448,252 A | 9/1995 | Ali | |
| 5,451,567 A | 9/1995 | Das | |
| 5,451,914 A | 9/1995 | Stengel | |
| 5,457,394 A | 10/1995 | McEwan | |
| 5,472,935 A | 12/1995 | Yandrofski | |
| 5,479,139 A | 12/1995 | Koscica | |
| 5,486,491 A | 1/1996 | Sengupta | |
| 5,496,795 A | 3/1996 | Das | |
| 5,502,372 A | 3/1996 | Quan | |
| 5,524,281 A | 6/1996 | Bradley | |
| 5,548,837 A | 8/1996 | Hess et al. | |
| 5,561,407 A | 10/1996 | Koscica | |
| 5,564,086 A | 10/1996 | Cygan | |
| 5,589,844 A * | 12/1996 | Belcher et al. | 343/860 |
| 5,593,495 A | 1/1997 | Masuda | |
| 5,635,433 A | 6/1997 | Sengupta | |
| 5,635,434 A | 6/1997 | Sengupta | |
| 5,640,042 A | 6/1997 | Koscica | |
| 5,679,624 A | 10/1997 | Das | |
| 5,689,219 A | 11/1997 | Piirainen | |
| 5,693,429 A | 12/1997 | Sengupta | |
| 5,694,134 A | 12/1997 | Barnes | |
| 5,699,071 A | 12/1997 | Urakami | |
| 5,766,697 A | 6/1998 | Sengupta | |
| 5,777,581 A | 7/1998 | Lilly | |
| 5,778,308 A | 7/1998 | Sroka | |
| 5,786,727 A | 7/1998 | Sigmon | |
| 5,812,572 A * | 9/1998 | King et al. | 372/38.04 |
| 5,812,943 A | 9/1998 | Suzuki | |
| 5,830,591 A | 11/1998 | Sengupta | |
| 5,846,893 A | 12/1998 | Sengupta | |
| 5,874,926 A | 2/1999 | Tsuru | |
| 5,880,635 A | 3/1999 | Satoh | |
| 5,886,867 A | 3/1999 | Chivukula | |
| 5,892,482 A | 4/1999 | Coleman et al. | |
| 5,929,717 A | 7/1999 | Richardson | |
| 5,963,871 A | 10/1999 | Zhinong | |
| 5,969,582 A | 10/1999 | Boesch | |
| 5,990,766 A | 11/1999 | Zhang | |
| 6,009,124 A | 12/1999 | Smith | |
| 6,020,787 A | 2/2000 | Kim | |
| 6,029,075 A | 2/2000 | Das | |
| 6,045,932 A | 4/2000 | Jia | |
| 6,061,025 A | 5/2000 | Jackson | |
| 6,074,971 A | 6/2000 | Chiu | |
| 6,096,127 A | 8/2000 | Dimos | |
| 6,100,733 A | 8/2000 | Dortu | |
| 6,101,102 A | 8/2000 | Brand | |
| 6,115,585 A * | 9/2000 | Matero et al. | 455/78 |
| 6,133,883 A | 10/2000 | Munson | |
| 6,172,385 B1 | 1/2001 | Duncombe | |
| 6,215,644 B1 | 4/2001 | Dhuler | |
| 6,281,847 B1 | 8/2001 | Lee | |
| 6,343,208 B1 | 1/2002 | Ying | |
| 6,377,142 B1 | 4/2002 | Chiu | |
| 6,377,217 B1 | 4/2002 | Zhu | |
| 6,377,440 B1 | 4/2002 | Zhu | |
| 6,384,785 B1 | 5/2002 | Kamogawa | |
| 6,404,614 B1 | 6/2002 | Zhu | |
| 6,408,190 B1 | 6/2002 | Ying | |
| 6,414,562 B1 | 7/2002 | Bouisse | |
| 6,415,562 B1 | 7/2002 | Donaghue | |
| 6,452,776 B1 | 9/2002 | Chakravorty | |
| 6,461,930 B2 | 10/2002 | Akram | |
| 6,466,774 B1 | 10/2002 | Okabe | |
| 6,492,883 B2 | 12/2002 | Liang | |
| 6,514,895 B1 | 2/2003 | Chiu | |
| 6,525,630 B1 | 2/2003 | Zhu | |
| 6,531,936 B1 | 3/2003 | Chiu | |
| 6,535,076 B2 | 3/2003 | Partridge | |
| 6,535,722 B1 | 3/2003 | Rosen | |
| 6,538,603 B1 | 3/2003 | Chen | |
| 6,556,102 B1 | 4/2003 | Sengupta | |
| 6,556,814 B1 | 4/2003 | Klomsdorf | |
| 6,570,462 B2 | 5/2003 | Edmonson | |
| 6,590,468 B2 | 7/2003 | du Toit et al. | |
| 6,590,541 B1 | 7/2003 | Schultze | |
| 6,597,265 B2 | 7/2003 | Liang | |
| 6,608,603 B2 | 8/2003 | Alexopoulos | |
| 6,624,786 B2 | 9/2003 | Boyle | |
| 6,640,085 B1 | 10/2003 | Chatzipetros | |
| 6,657,595 B1 | 12/2003 | Phillips | |
| 6,661,638 B2 | 12/2003 | Jackson | |
| 6,670,256 B2 | 12/2003 | Yang | |
| 6,710,651 B2 | 3/2004 | Forrester | |
| 6,724,611 B1 | 4/2004 | Mosley | |
| 6,724,890 B1 | 4/2004 | Bareis | |
| 6,737,179 B2 | 5/2004 | Sengupta | |
| 6,759,918 B2 | 7/2004 | Du Toit | |
| 6,765,540 B2 | 7/2004 | Toncich | |
| 6,768,472 B2 | 7/2004 | Alexopoulos | |
| 6,774,077 B2 | 8/2004 | Sengupta | |
| 6,795,712 B1 | 9/2004 | Vakilian | |
| 6,825,818 B2 | 11/2004 | Toncich | |
| 6,839,028 B2 | 1/2005 | Lee | |
| 6,845,126 B2 | 1/2005 | Dent | |
| 6,859,104 B2 | 2/2005 | Toncich | |
| 6,862,432 B1 | 3/2005 | Kim | |
| 6,864,757 B2 | 3/2005 | Du Toit | |
| 6,868,260 B2 | 3/2005 | Jagielski | |
| 6,888,714 B2 | 5/2005 | Shaw | |
| 6,905,989 B2 | 6/2005 | Ellis | |
| 6,907,234 B2 | 6/2005 | Karr | |
| 6,920,315 B1 | 7/2005 | Wilcox | |
| 6,943,078 B1 | 9/2005 | Zheng | |
| 6,946,847 B2 | 9/2005 | Nishimori | |
| 6,949,442 B2 | 9/2005 | Barth | |
| 6,961,368 B2 | 11/2005 | Dent | |
| 6,964,296 B2 | 11/2005 | Memory | |
| 6,965,837 B2 | 11/2005 | Vintola | |
| 6,993,297 B2 | 1/2006 | Smith | |
| 7,009,455 B2 | 3/2006 | Toncich | |
| 7,071,776 B2 | 7/2006 | Forrester | |
| 7,106,715 B1 | 9/2006 | Kelton | |
| 7,107,033 B2 | 9/2006 | du Toit | |
| 7,113,614 B2 | 9/2006 | Rhoads | |
| 7,151,411 B2 | 12/2006 | Martin | |
| 7,176,634 B2 | 2/2007 | Kitamura | |
| 7,176,845 B2 | 2/2007 | Fabrega-Sanchez | |
| 7,180,467 B2 | 2/2007 | Fabrega-Sanchez | |
| 7,221,327 B2 | 5/2007 | Toncich | |
| 7,298,329 B2 | 11/2007 | Diament | |
| 7,312,118 B2 | 12/2007 | Kiyotoshi | |
| 7,332,980 B2 | 2/2008 | Zhu | |
| 7,332,981 B2 | 2/2008 | Matsuno | |
| 7,339,527 B2 | 3/2008 | Sager | |

| | | |
|---|---|---|
| 7,426,373 B2 | 9/2008 | Clingman |
| 7,427,949 B2 | 9/2008 | Channabasappa et al. |
| 7,468,638 B1 | 12/2008 | Tsai |
| 7,535,080 B2 | 5/2009 | Zeng et al. |
| 7,535,312 B2 | 5/2009 | McKinzie |
| 7,539,527 B2 | 5/2009 | Jang |
| 7,596,357 B2 | 9/2009 | Nakamata |
| 7,633,355 B2 * | 12/2009 | Matsuo .................... 333/32 |
| 7,667,663 B2 | 2/2010 | Hsiao |
| 7,705,692 B2 | 4/2010 | Fukamachi et al. |
| 7,711,337 B2 | 5/2010 | McKinzie |
| 7,714,678 B2 | 5/2010 | du Toit |
| 7,728,693 B2 | 6/2010 | du Toit |
| 7,768,400 B2 | 8/2010 | Lawrence et al. |
| 7,786,819 B2 * | 8/2010 | Ella et al. ................ 333/17.3 |
| 7,795,990 B2 | 9/2010 | du Toit |
| 7,852,170 B2 | 12/2010 | McKinzie |
| 7,865,154 B2 | 1/2011 | Mendolia |
| 7,907,094 B2 | 3/2011 | Kakitsu et al. |
| 7,917,104 B2 | 3/2011 | Manssen et al. |
| 7,969,257 B2 | 6/2011 | du Toit |
| 7,991,363 B2 | 8/2011 | Greene |
| 8,112,043 B2 | 2/2012 | Knudsen et al. |
| 8,170,510 B2 | 5/2012 | Knudsen et al. |
| 8,190,109 B2 | 5/2012 | Ali et al. |
| 8,217,732 B2 | 7/2012 | McKinzie |
| 8,320,850 B1 | 11/2012 | Khlat |
| 2002/0008672 A1 | 1/2002 | Gothard et al. |
| 2002/0030566 A1 * | 3/2002 | Bozler et al. ............... 333/246 |
| 2002/0109642 A1 | 8/2002 | Gee et al. |
| 2002/0118075 A1 | 8/2002 | Ohwada et al. ............ 333/32 |
| 2002/0145483 A1 * | 10/2002 | Bouisse .................... 333/17.3 |
| 2002/0167963 A1 | 11/2002 | Joa-Ng |
| 2002/0187780 A1 | 12/2002 | Souissi |
| 2002/0191703 A1 | 12/2002 | Ling |
| 2002/0193088 A1 | 12/2002 | Jung |
| 2003/0060227 A1 | 3/2003 | Sekine |
| 2003/0071300 A1 | 4/2003 | Yashima |
| 2003/0114124 A1 | 6/2003 | Higuchi |
| 2003/0142022 A1 | 7/2003 | Ollikainen |
| 2003/0193997 A1 | 10/2003 | Dent |
| 2003/0199286 A1 | 10/2003 | D du Toit |
| 2003/0210206 A1 | 11/2003 | Phillips |
| 2003/0232607 A1 | 12/2003 | Le Bars |
| 2004/0009754 A1 * | 1/2004 | Smith, Jr. .................... 455/82 |
| 2004/0090372 A1 | 5/2004 | Nallo |
| 2004/0100341 A1 * | 5/2004 | Luetzelschwab et al. .... 333/32 |
| 2004/0127178 A1 * | 7/2004 | Kuffner .................... 455/133 |
| 2004/0137950 A1 | 7/2004 | Bolin |
| 2004/0202399 A1 | 10/2004 | Kochergin |
| 2004/0257293 A1 | 12/2004 | Friedrich |
| 2005/0007291 A1 * | 1/2005 | Fabrega-Sanchez et al. . 343/860 |
| 2005/0032488 A1 | 2/2005 | Pehlke |
| 2005/0032541 A1 | 2/2005 | Wang |
| 2005/0042994 A1 | 2/2005 | Otaka |
| 2005/0059362 A1 | 3/2005 | Kalajo |
| 2005/0082636 A1 | 4/2005 | Yashima |
| 2005/0085204 A1 | 4/2005 | Poilasne et al. |
| 2005/0093624 A1 | 5/2005 | Forrester et al. |
| 2005/0130608 A1 | 6/2005 | Forse |
| 2005/0130699 A1 * | 6/2005 | Kim .................... 455/550.1 |
| 2005/0208960 A1 | 9/2005 | Hassan |
| 2005/0215204 A1 | 9/2005 | Wallace |
| 2005/0264455 A1 | 12/2005 | Talvitie |
| 2005/0282503 A1 | 12/2005 | Onno |
| 2006/0003537 A1 | 1/2006 | Sinha |
| 2006/0009165 A1 | 1/2006 | Alles |
| 2006/0160501 A1 | 7/2006 | Mendolia |
| 2006/0183433 A1 | 8/2006 | Mori et al. |
| 2006/0183442 A1 | 8/2006 | Chang et al. |
| 2006/0205368 A1 * | 9/2006 | Bustamante et al. ......... 455/101 |
| 2006/0281423 A1 | 12/2006 | Caimi |
| 2007/0013483 A1 | 1/2007 | Stewart |
| 2007/0035458 A1 | 2/2007 | Ohba |
| 2007/0042725 A1 | 2/2007 | Poilasne |
| 2007/0042734 A1 | 2/2007 | Ryu |
| 2007/0080888 A1 | 4/2007 | Mohamadi |
| 2007/0082611 A1 | 4/2007 | Terranova et al. |
| 2007/0085609 A1 | 4/2007 | Itkin |

| | | |
|---|---|---|
| 2007/0142014 A1 | 6/2007 | Wilcox |
| 2007/0149146 A1 | 6/2007 | Hwang |
| 2007/0182636 A1 | 8/2007 | Carlson |
| 2007/0184825 A1 | 8/2007 | Lim et al. |
| 2007/0194859 A1 * | 8/2007 | Brobston et al. ............ 333/17.3 |
| 2007/0197180 A1 | 8/2007 | McKinzie et al. |
| 2007/0200766 A1 | 8/2007 | McKinzie |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0055016 A1 | 3/2008 | Morris |
| 2008/0081670 A1 | 4/2008 | Rofougaran |
| 2008/0106350 A1 | 5/2008 | McKinzie |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0261544 A1 | 10/2008 | Blin |
| 2008/0274706 A1 | 11/2008 | Blin |
| 2008/0300027 A1 | 12/2008 | Dou et al. |
| 2008/0305749 A1 | 12/2008 | Ben-Bassat |
| 2009/0002077 A1 | 1/2009 | Rohani et al. |
| 2009/0027286 A1 | 1/2009 | Ohishi |
| 2009/0082017 A1 | 3/2009 | Chang et al. |
| 2009/0109880 A1 | 4/2009 | Kim et al. |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 * | 10/2009 | Song .................... 455/8 |
| 2009/0278253 A1 * | 11/2009 | Potyrailo et al. .......... 340/572.1 |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0073103 A1 | 3/2010 | Spears et al. |
| 2010/0085260 A1 | 4/2010 | McKinzie |
| 2010/0105425 A1 * | 4/2010 | Asokan .................... 455/552.1 |
| 2010/0156552 A1 | 6/2010 | McKinzie |
| 2010/0232474 A1 | 9/2010 | Rofougaran |
| 2010/0285836 A1 | 11/2010 | Horihata et al. |
| 2010/0302106 A1 | 12/2010 | Knudsen et al. |
| 2010/0304688 A1 | 12/2010 | Knudsen |
| 2011/0012790 A1 | 1/2011 | Badaruzzaman |
| 2011/0086630 A1 | 4/2011 | Manssen |
| 2011/0102290 A1 | 5/2011 | Milosavljevic |
| 2011/0121079 A1 | 5/2011 | Lawrence et al. |
| 2011/0133994 A1 | 6/2011 | Korva |
| 2011/0183628 A1 * | 7/2011 | Baker .................... 455/67.14 |
| 2011/0183633 A1 | 7/2011 | Ohba |
| 2011/0256857 A1 | 10/2011 | Chen et al. |
| 2011/0281532 A1 | 11/2011 | Shin et al. |
| 2012/0075159 A1 | 3/2012 | Chang |
| 2012/0100802 A1 | 4/2012 | Mohebbi |

FOREIGN PATENT DOCUMENTS

| | | |
|---|---|---|
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2328233 | 6/2011 |
| JP | 03276901 | 3/1990 |
| JP | 9321526 | 12/1997 |
| JP | 10209722 | 8/1998 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |
| WO | WO-2009/064968 | 5/2009 |
| WO | 2009/155966 | 12/2009 |
| WO | WO-2011/044592 | 4/2011 |
| WO | 2011/084716 | 7/2011 |
| WO | WO-2011/133657 | 10/2011 |
| WO | WO-2011028453 | 10/2011 |
| WO | 2012/085932 | 6/2012 |

OTHER PUBLICATIONS

Patent Cooperation Treaty, "International Search Report and Written Opinion", International Application No. PCT/US2010/056413, Jul. 27, 2011.

Pervez, N.K., "High Tunability barium strontium titanate thin films for RF circuit applications", Applied Physics Letters, 2004 American Institute of Physics.

Stemmer, Susanne, "Low-loss tunable capacitors fabricated directly on gold bottom electrodes", University of California Postprints 2006.

Taylor, T.R., "Impact of thermal strain on the dielectric constant of sputtered barium strontium titanate thin films", Applied Physics Letters, 2002 American Institute of Physics.

Tombak, Ali, "Tunable Barium Strontium Titanate Thin Film Capacitors for RF and Microwave Applications", IEEE Microwave and Wireles Components Letters, vol. 12, Jan. 2002.

Xu, Hongtao, "Tunable Microwave Integrated Circuits using BST Thin Film Capacitors with Device", Integrated Ferroelectrics, Department of Electrical Engineering and Computer Engineering, University of California, 2005.

Du Toit, "Tunable Microwave Devices With Auto Adjusting Matching Circuit", U.S. Appl. No. 13/302,617, filed Nov. 22, 2011.

Du Toit, "Tunable Microwave Devices With Auto-Adjusting Matching Circuit", U.S. Appl. No. 13/302,649, filed Nov. 22, 2011.

Greene, "Method and Apparatus for Tuning a Communication Device", U.S. Appl. No. 13/108,463, filed May 16, 2011.

Greene, "Method and Apparatus for Tuning a Communication Device", U.S. Appl. No. 13/108,589, filed May 16, 2011.

Hoirup, "Method and Apparatus for Radio Antenna Frequency Tuning", U.S. Appl. No. 13/030,177, filed Feb. 18, 2011.

Manssen, "Method and Apparatus for Managing Interference in a Communication Device", U.S. Appl. No. 61/326,206, filed Apr. 20, 2010.

Manssen, "Method and Apparatus for Tuning Antennas in a Communication Device", U.S. Appl. No. 12/941,972, filed Nov. 8, 2010.

Manssen, "Method and Apparatus for Tuning Antennas in a Communication Device", U.S. Appl. No. 13/005,122, filed Jan. 12, 2011.

McKinzie, "Adaptive Impedance Matching Module (AIMM) Control Architectures", U.S. Appl. No. 13/293,544, filed Nov. 10, 2011.

McKinzie, "Adaptive Impedance Matching Module (AIMM) Control Architectures", U.S. Appl. No. 13/293,550, filed Nov. 10, 2011.

McKinzie, "Method and Apparatus for Adaptive Impedance Matching", U.S. Appl. No. 13/217,748, filed Aug. 25, 2011.

Mendolia, "Method and Apparatus for Tuning a Communication Device", U.S. Appl. No. 13/035,417, filed Feb. 25, 2011.

Paratek Microwave, Inc., "Method and Appartus for Tuning Antennas in a Communication Device", International Application No. PCT/US11/59620; filed Nov. 7, 2011.

Spears, "Methods for Tuning an Adaptive Impendance Matching Network With a Look-Up Table", U.S. Appl. No. 13/297,951, filed Nov. 16, 2011.

Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.

Patent Cooperation Treaty, "International Search Report and Written Opinion", International Applicaton No. PCT/US2010/046241, Mar. 2, 2011.

Patent Cooperation Treaty, "International Search Report and Written Opinion", PCT Application No. PCT/US08/005085, Jul. 2, 2008.

Qiao, et al., "Antenna Impedance Mismatch Measurement and Correction for Adaptive COMA Transceivers", IEEE, 2005.

Qiao, et al., "Measurement of Antenna Load Impedance for power Amplifiers", The Department of Electrical and Computer Engineering, University of California, San Diego, Sep. 13, 2004.

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.

Payandehjoo, Kasra ,"Novel Techniques for Coupling Reduction in Multi-Antenna Hand-held Devices", IEEE Student Member, 1-8, 2001.

Petit, Laurent ,"MEMS-Switched Parasitic-Antenna Array for Radiation Pattern Diversity", IEEE Transactions on Antennas and Propagation, vol. 54, No. 9, Sep. 2009, 2624-2631.

Zuo, S. ,"Eigenmode Decoupling for Mimo Loop-Antenna Based on 180 Coupler", Progress in Electromagnetics Research Letters, vol. 26, 2011, 11-20.

Huang, Libo et al., "Theoretical and experimental investigation of adaptive antenna impedance matching for multiband mobile phone applications", IEEE, Sep. 7, 2005, 13-17.

Patent Cooperation Treaty, "International Search Report and Written Opinion", Nov. 16, 2011, International Application No. PCT/US/2011/038543.

* cited by examiner

800

900

1000

1100

1200

LOOK-UP TABLE

| Band 1; Use Case 1; Desired tuning state |
|---|
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

FIG. 13

METHOD AND APPARATUS FOR CALIBRATING A COMMUNICATION DEVICE

FIELD OF THE DISCLOSURE

The present disclosure relates generally to calibration techniques, and more specifically to a method and apparatus for calibrating a communication device.

BACKGROUND

Existing multi-frequency wireless devices (e.g., radios) use an antenna structure that attempts to radiate at optimum efficiency over the entire frequency range of operation, but can really only do so over a subset of the frequencies. Due to size constraints, and aesthetic design reasons, the antenna designer is forced to compromise the performance in some of the frequency bands. An example of such a wireless device could be a mobile telephone that operates over a range of different frequencies, such as 800 MHz to 2200 MHz. The antenna will not radiate efficiently at all frequencies due to the nature of the design, and the power transfer between the antenna, the power amplifier, and the receiver in the radio will vary significantly.

Additionally, an antenna's performance is impacted by its operating environment. For example, multiple use cases exist for radio handsets, which include such conditions as the placement of the handset's antenna next to a user's head, or in the user's pocket or the covering of an antenna with a hand, which can significantly impair wireless device efficiency.

Further, many existing radios use a simple circuit composed of fixed value components that are aimed at improving the power transfer from power amplifier to antenna, or from the antenna to the receiver, but since the components used are fixed in value there is always a compromise when attempting to cover multiple frequency bands and multiple use cases.

BRIEF DESCRIPTION OF THE DRAWINGS

FIG. 13 depicts an illustrative embodiment of a look-up table utilized by the communication device for controlling the matching network of the transceiver of FIG. 2.

DETAILED DESCRIPTION

Figure 1:
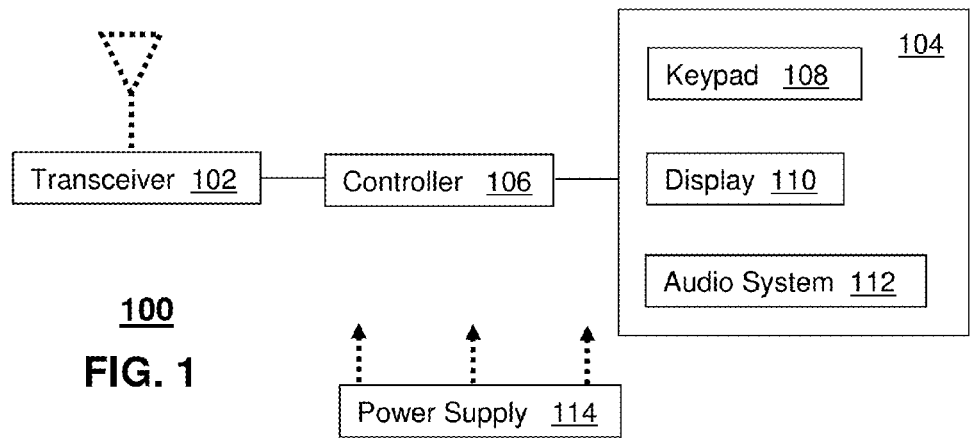
FIG. 1 depicts an illustrative embodiment of a communication device.

One embodiment of the present disclosure entails a method to select a subset of tuning states of a tunable matching network operable in a communication device, wherein the tunable matching network has a tunable reactance that affects one or more performance parameters of the communication device, perform actual measurements of the one or more performance parameters of the communication device according to the subset of tuning states, determine estimated measurements of the one or more performance parameters for a portion of the tuning states not included in the subset of tuning states according to the actual measurements of the one or more performance parameters, identify a data set for each of the one or more performance parameters from the tuning states and the actual and estimated measurements, recognize one or more desirable performance characteristics of the communication device, and determine from at least a portion of the one or more data sets one or more tuning states of the tunable matching network that achieves the one or more desirable performance characteristics of the communication device.

One embodiment of the present disclosure entails a computer-readable storage medium having computer instructions to perform actual measurements of one or more performance parameters of a communication device according to a subset of tuning states of a tunable matching network operable in a communication device, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the date sets one or more tuning states that achieve at least one desirable performance characteristic of the communication device.

One embodiment of the present disclosure entails a method to distribute a software application by way of an electronic system. The software application can be operable to perform actual measurements of one or more performance parameters of a communication device according to a subset of tuning states of a tunable reactive element of a communication device, estimate measurements of the of the one or more performance parameters for a portion of the tuning states not included in the subset of tuning states according to at least portions of the actual measurements, and determine a multi-dimensional data set for each of the one or more performance parameters from at least portions of the tuning states and the actual and estimated measurements.

One embodiment of the present disclosure entails a tunable matching network useable in a communication device having a tunable reactive element tuned according to a look-up table. The look-up table can have tuning states that achieve at least one desirable performance characteristic of the communication device. The tuning states can be determined according to a method to perform actual measurements of one or more performance parameters of the communication device according to a subset of tuning states of the tunable reactive element, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the date sets the tuning states that achieve the at least one desirable performance characteristic of the communication device.

FIG. 1 depicts an exemplary embodiment of a communication device 100. The communication device 100 can comprise a wireless transceiver 102 (herein having independent transmit and receiver sections, a user interface (UI) 104, a power supply 114, and a controller 106 for managing operations thereof. The wireless transceiver 102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1X, WCDMA, UMTS/HSDPA, GSM/GPRS, TDMA/EDGE, EV/DO, WiMAX, and next generation cellular wireless communication technologies as they arise.

The UI 104 can include a depressible or touch-sensitive keypad 108 with a navigation mechanism such as a roller ball, joystick, mouse, or navigation disk for manipulating operations of the communication device 100. The keypad 108 can be an integral part of a housing assembly of the communication device 100 or an independent device operably coupled thereto by a tethered wireline interface (such as a flex cable) or a wireless interface supporting for example Bluetooth. The keypad 108 can represent a numeric dialing keypad commonly used by phones, and/or a Qwerty keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is a touch-sensitive display, a portion or all of the keypad 108 can be presented by way of the display.

The power supply 114 can utilize common power management technologies (such as replaceable batteries, supply regulation technologies, and charging system technologies) for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other like technologies.

Figure 2:
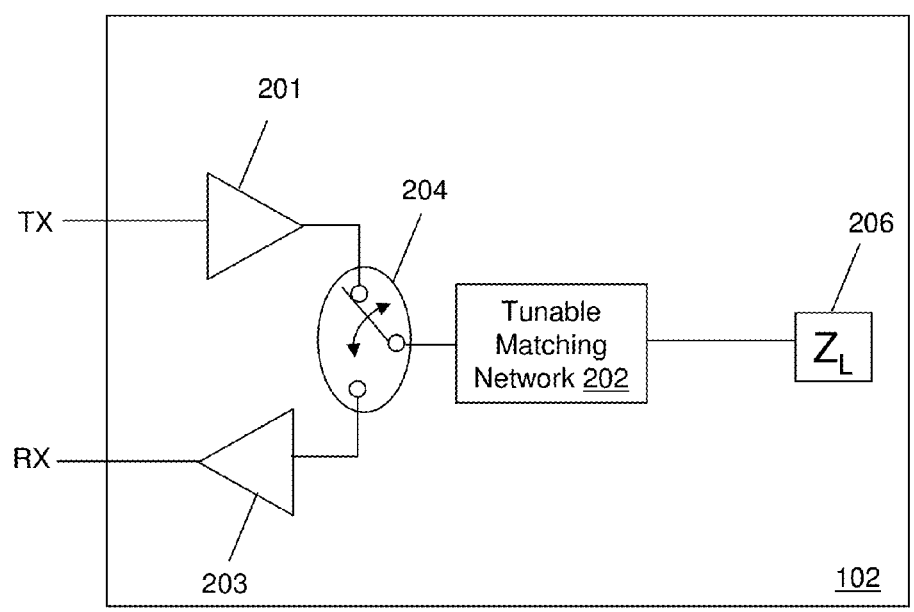
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include common amplifiers 201, 203 coupled to a tunable matching network 202 and an impedance load 206 by way of a switch 204. The load 206 in the present illustration can an antenna as shown in FIG. 1 (herein antenna 206). A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA. These undisclosed configurations are contemplated by the present disclosure.

Figure 3:
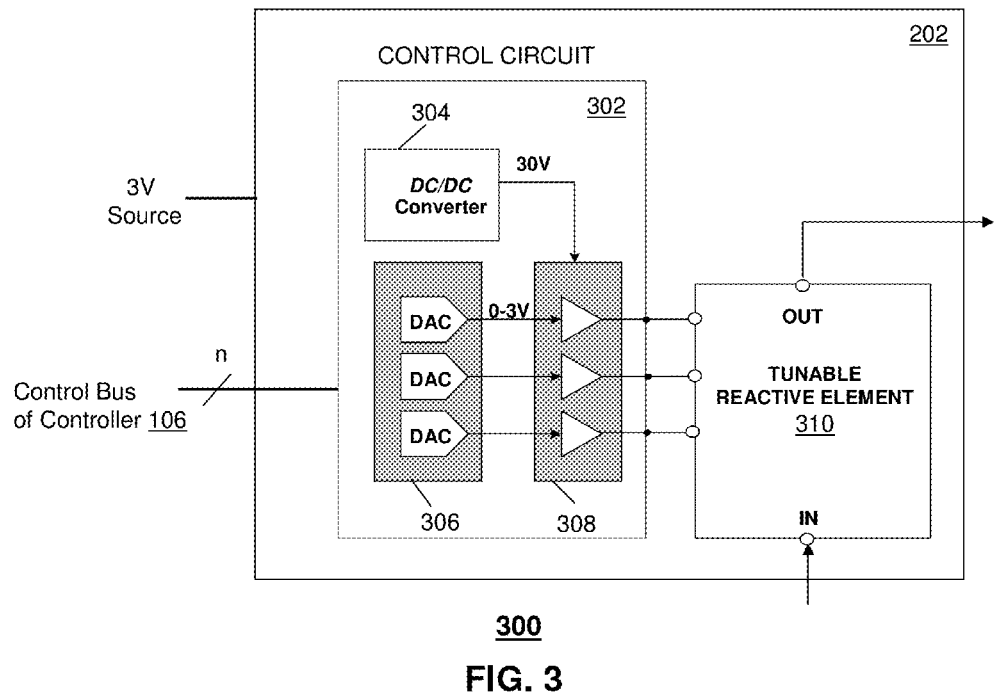
FIGS. 3-4 depict illustrative embodiments of a tunable matching network of the transceiver of FIG. 2.
Figure 4:
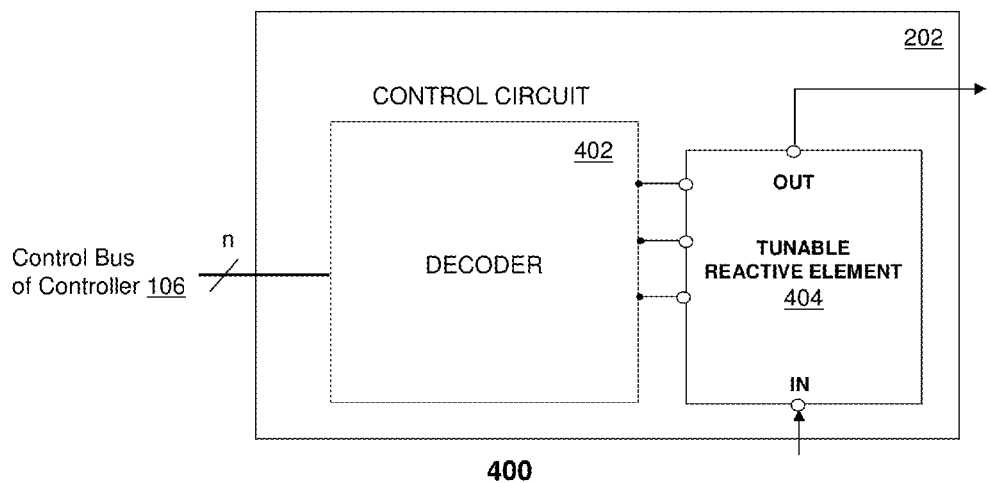
Figure 5:
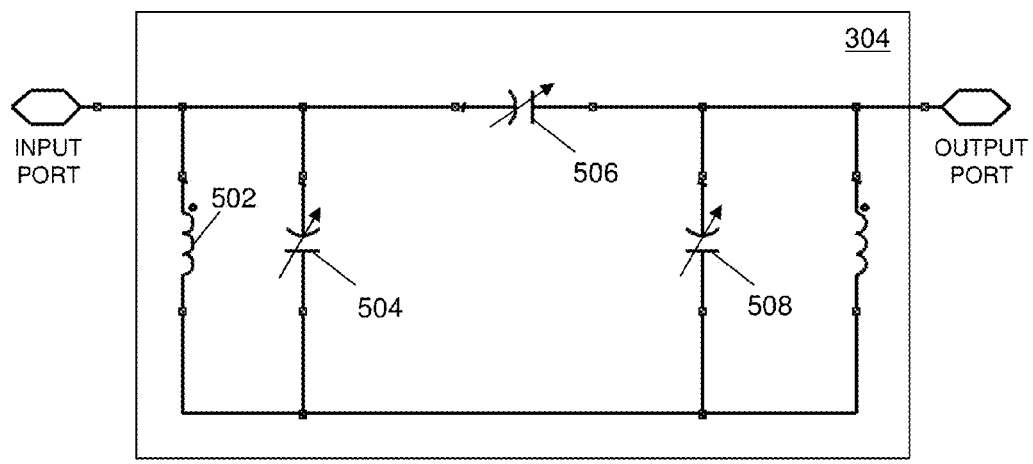
FIGS. 5-6 depict illustrative embodiments of a tunable reactive element of the tunable matching network.

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 504, 506 and 508 such as shown in FIG. 5, which depicts a possible circuit configuration for the tunable reactive element 310. In this illustration, the tunable reactive element 310 includes three tunable capacitors 504-508 and an inductor 502 with a fixed inductance. Other circuit configurations are possible, and thereby contemplated by the present disclosure.

The tunable capacitors 504-508 can each utilize technology that enables tunability of the capacitance of said component. One embodiment of the tunable capacitors 504-508 can utilize voltage or current tunable dielectric materials such as a composition of barium strontium titanate (BST). An illustration of a BST composition is the Parascan® Tunable Capacitor. In another embodiment, the tunable reactive element 310 can utilize semiconductor varactors. Other present or next generation methods or material compositions that can support a means for a voltage or current tunable reactive element are contemplated by the present disclosure.

The DC-to-DC converter 304 can receive a power signal such as 3 Volts from the power supply 114 of the communication device 100 in FIG. 1. The DC-to-DC converter 304 can use common technology to amplify this power signal to a higher range (e.g., 30 Volts) such as shown. The controller 106 can supply digital signals to each of the DACs 306 by way of a control bus of "n" or more wires to individually control the capacitance of tunable capacitors 504-508, thereby varying the collective reactance of the tunable matching network 202. The control bus can be implemented with a two-wire common serial communications technology such as a Serial Peripheral Interface (SPI) bus. With an SPI bus, the controller 106 can submit serialized digital signals to configure each DAC in FIG. 3 or the switches of the tunable reactive element 404 of FIG. 4. The control circuit 302 of FIG. 3 can utilize common digital logic to implement the SPI bus and to direct digital signals supplied by the controller 106 to the DACs.

Figure 6:
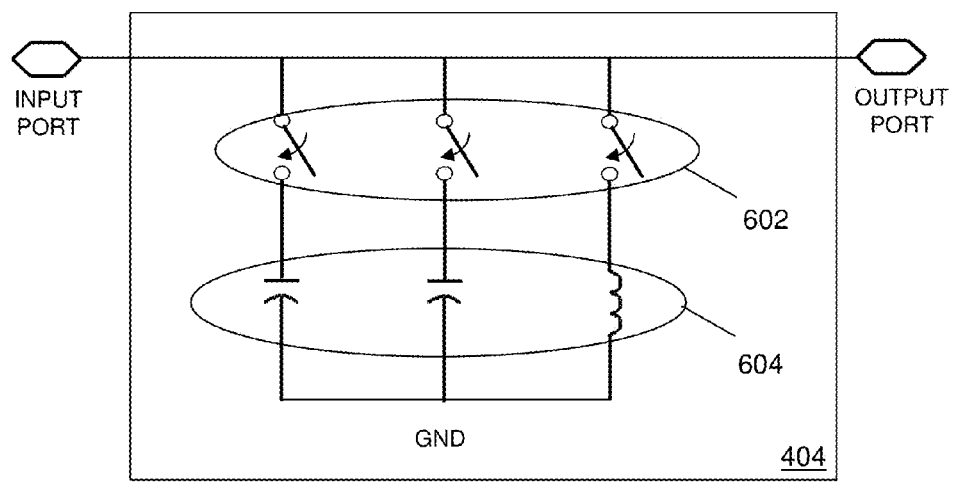

In another embodiment, the tunable matching network 202 can comprise a control circuit 402 in the form of a decoder and a tunable reactive element 404 comprising switchable reactive elements such as shown in FIG. 6. In this embodiment, the controller 106 can supply the control circuit 402 signals via the SPI bus which can be decoded with common Boolean or state machine logic to individually enable or disable the switching elements 602. The switching elements 602 can be implemented with semiconductor switches or micro-machined switches such as utilized in micro-electromechanical systems (MEMS). By independently enabling and disabling the reactive elements (capacitor or inductor) of FIG. 6 with the switching elements 602, the collective reactance of the tunable reactive element 404 can be varied.

Figure 7:
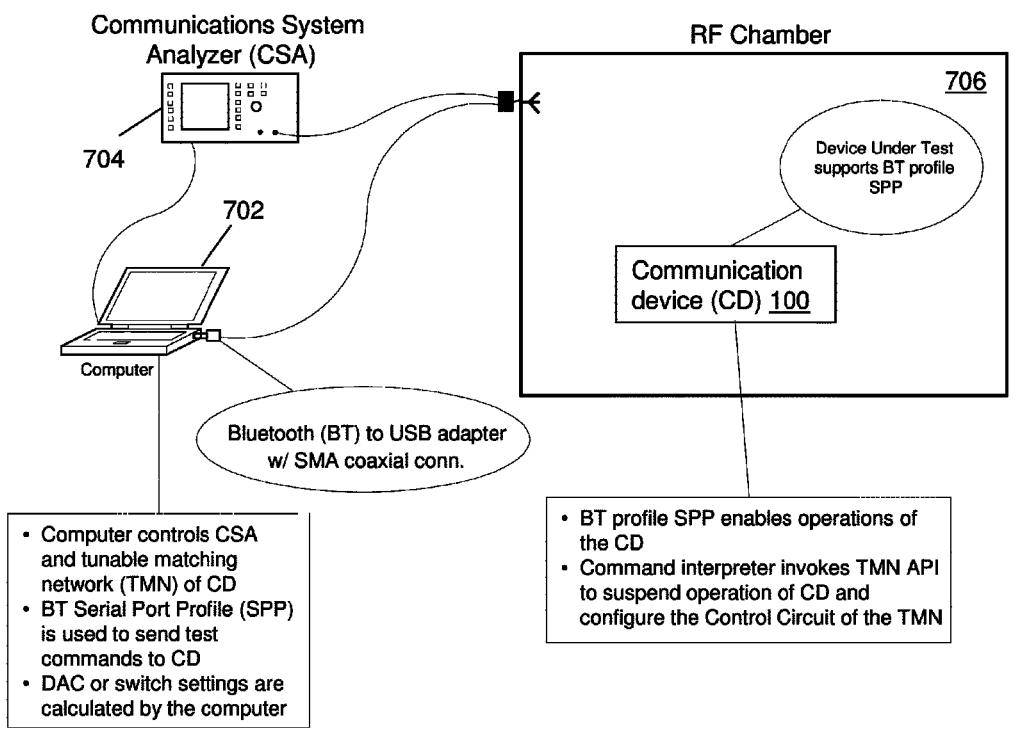
FIG. 7 depicts an illustrative embodiment of a test environment for configuring the communication device of FIG. 1.

The tunability of the tunable matching networks 202, 204 provides the controller 106 a means to optimize performance parameters of the transceiver 102 such as, for example, but not limited to, transmitter power, transmitter efficiency, receiver sensitivity, power consumption of the communication device, a specific absorption rate (SAR) of energy by a human body, frequency band performance parameters, and so on. To achieve one or more desirable performance characteristics which a designer can define, the communication device 100 can be placed in an anechoic chamber 706 such as depicted by FIG. 7. In this configuration, the designer can perform calibration measurements of performance parameters of the communication device 100 such as Total Radiated Power (TRP), Total Isotropic Sensitivity (TIS) or Radiated Harmonics measurements, receiver efficiency, transmit power efficiency, and power consumption, just to mention a few. For a multi-frequency band communication device 100, the calibration measurements can be performed per band or per sub-band.

Additionally, the calibration measurements can be performed under a number of use cases of the communication device 100 utilizing a phantom body that emulates the composition of a human body. For instance, a communication device 100 having a housing assembly of a flip design, the communication device 100 can be placed next to an ear of the phantom when the flip is open to emulate a typical conversational use case. In a hands-free application such when a user utilizes a Bluetooth headset or when the communication device 100 is in standby mode, the communication device 100 can be placed on a hip of the phantom with the flip closed. Calibration can be performed on other use cases such as antenna up, or down, speakerphone feature "ON" with communication device 100 held with a phantom hand but away from the phantom head. Any number of use cases can be applied to each frequency band and sub-band if desirable.

As depicted in FIG. 7, a computer 702 can be communicatively coupled to the communication device 100 located in the anechoic chamber by way of a Bluetooth to USB adapter with coaxial connection. The computer 702 can also be communicatively coupled to a communications system analyzer 704 (which can place and receive active "phone calls" to a cellular handset) which is also connected to the anechoic chamber by way of coaxial cable connection. The computer 702 can control the communications system analyzer 704 and the tunable matching network 202 of FIG. 2. Control of the communication device 100 can conform to a Bluetooth Serial Port Profile (SPP) which provides the computer 702 a means to send test commands, control DAC settings, or switch settings by way of control circuits 302 or 402 of FIG. 3 or 4. Although not shown, the calibration environment of FIG. 7 can include additional test equipment that can measure power consumption of the communication device 100, SAR, harmonics or other useful performance parameters. Accordingly, any measurable performance parameter of the communication device 100 is contemplated by the present disclosure.

Figure 8:
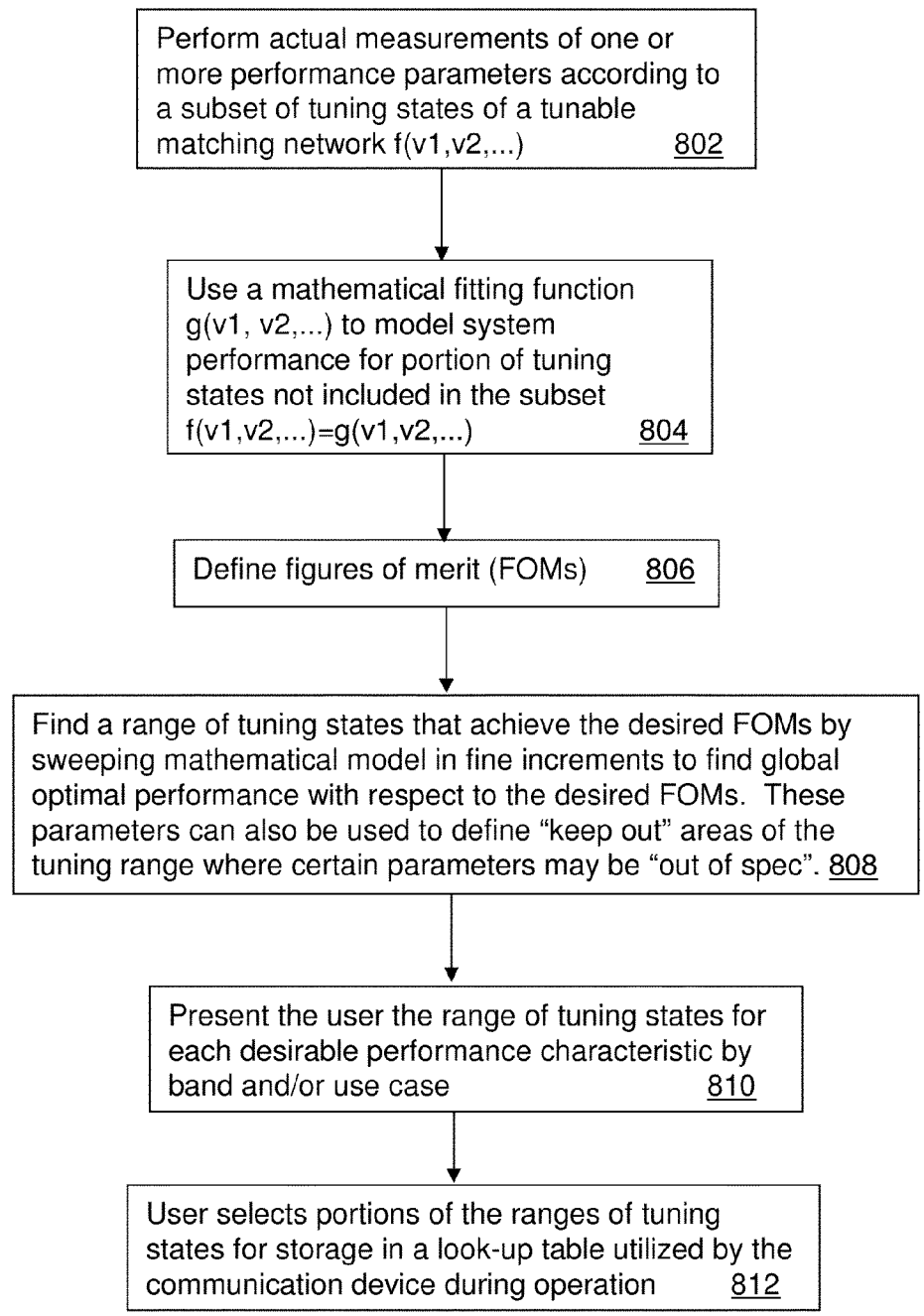
FIG. 8 depicts an exemplary method operating in portions of the test environment of FIG. 7.

FIG. 8 depicts an exemplary method 800 operating in portions of the test environment of FIG. 7. Method 800 can begin with the computer 702 directing the operations of the communication device 100 and the configuration of the tunable matching network 202 to perform actual measurements of one or more performance parameters (e.g., TX power, RX sensitivity via received signal strength indication or RSSI, power consumption, and so on) of the communication device 100. Suppose for instance that tunable matching network 202 includes three DACs each having thirty-two configurable output voltages ranging from 0 to 3 Volts as shown in FIG. 3. Three DACs would provide 32,768 (32*32*32) combination of voltages which can be supplied to the three tunable capacitors 504-508 of FIG. 5. Assume further that the transceiver 102 supports 4 bands for world travel, and the designer of the communication device 100 would like to test 3 use cases per band. Under these conditions, the designer would have to perform 393,216 calibration measurements for each performance parameter of interest, which could lead to millions of measurements.

Step 802, however, can be adapted to perform a subset of the possible tuning states of the DACs 306. For example, the computer 702 can be adapted to perform calibration measurements for five tuning states of each DAC. Under these constraints, the calibration measurements can be limited to 125 (5*5*5) calibration measurements for each performance parameter of interest. If one includes 4 bands and 3 use cases, then the total calibration measurements can amount to 1500 measurements, which is obviously substantially less than a full sweep of calibration measurements.

Figure 9:
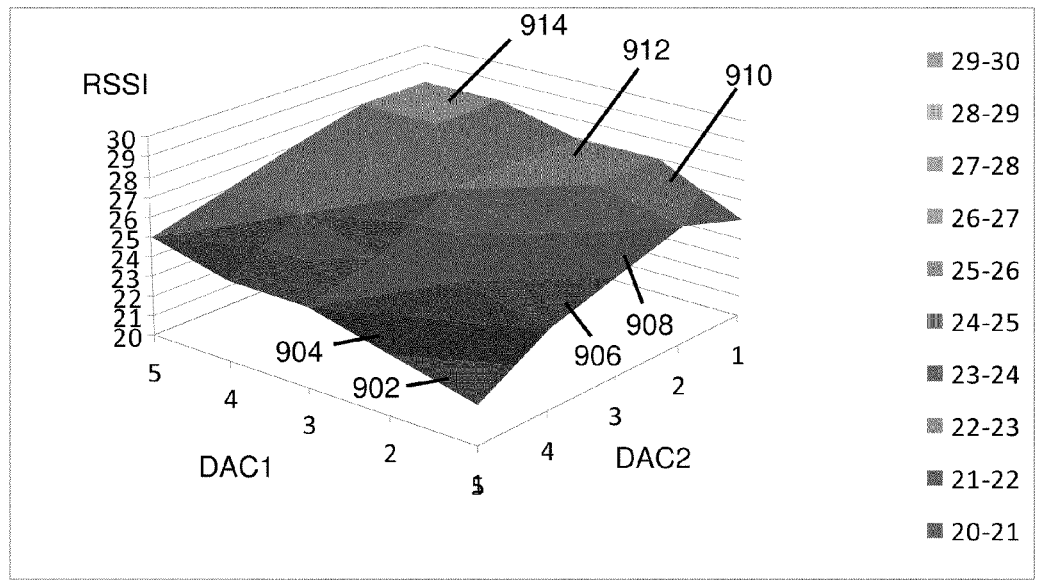
FIGS. 9-12 depict illustrative embodiments of data sets before and after an application of a smoothing function.

For illustration purposes only, the tuning matching network 202 as depicted in FIG. 3 will be assumed to have only two DACs, each capable of 20 tunable levels. It is further assumed that a subset of 5 tuning states is used for step 802. With this in mind, FIG. 9 depicts a data set of 25 calibration measurements of receive sensitivity data based on RSSI measurements. The graph of FIG. 9 illustrates 1 dB contour bands. As should be evident from FIG. 9, contour bands 902-914 are not smooth. The jagged bands occur for two reasons. First, the RSSI data points are inaccurate because the communication device 100 can only provide non-fractional RSSI data. Second, the missing tuning states create a step effect which creates additional jagged edges between contour bands.

In step 804, the computer 702 can be adapted to apply a common mathematical fitting function $g(v1, v2, \ldots)$ to model system performance for the portion of tuning states not included in the subset of step 802. The fitting function can also reduce inaccuracies in the RSSI data. The fitting function can be a $3^{rd}$ or $4^{th}$ order function that utilizes a common regression algorithm to interpolate between the actual measurements derived from step 802. For illustration purposes, what follows is a sample $3^{rd}$ order fitting function:

$$c1+c2x+c3y+c4x^2+c5y^2+c6xy+c7xy^2+c8x^2y+c9x^3+c10y^3$$

Figure 10:
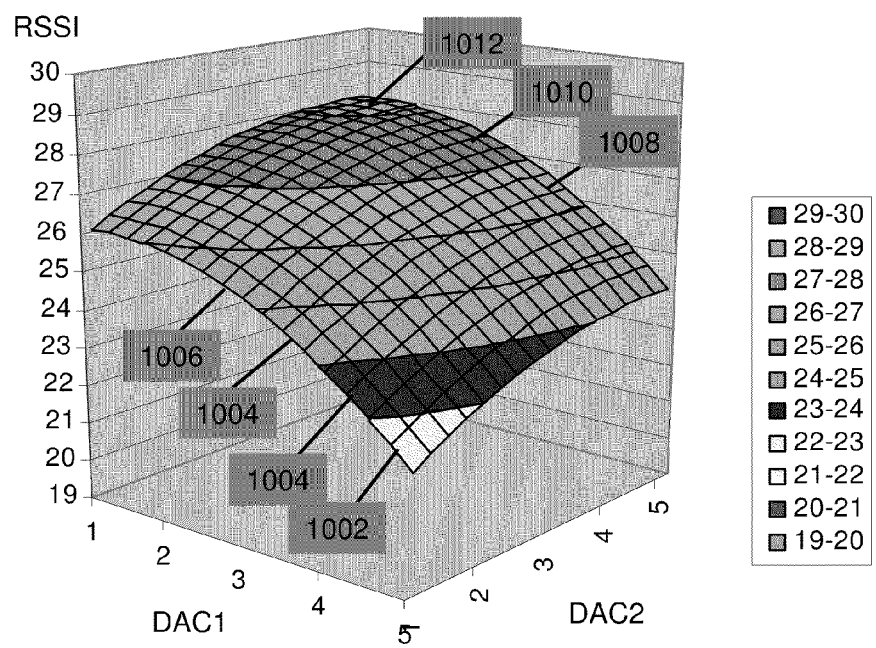

Constants c1-c10 can be adapted through an iterative process to perform a third order fitting function. Other fitting functions are contemplated by the present disclosure. FIG. 10 depicts the result of applying the fitting function to the RSSI data set of FIG. 9. As should be evident from FIG. 10, the 1 dB contour bands 1002-1012 have been substantially smoothed to more accurately reflect the actual RSSI measurements and to estimate the RSSI measurements which would have been measured for the tuning states of the DACs 1 and 2 which were not included in the subset of step 802.

Figure 11:
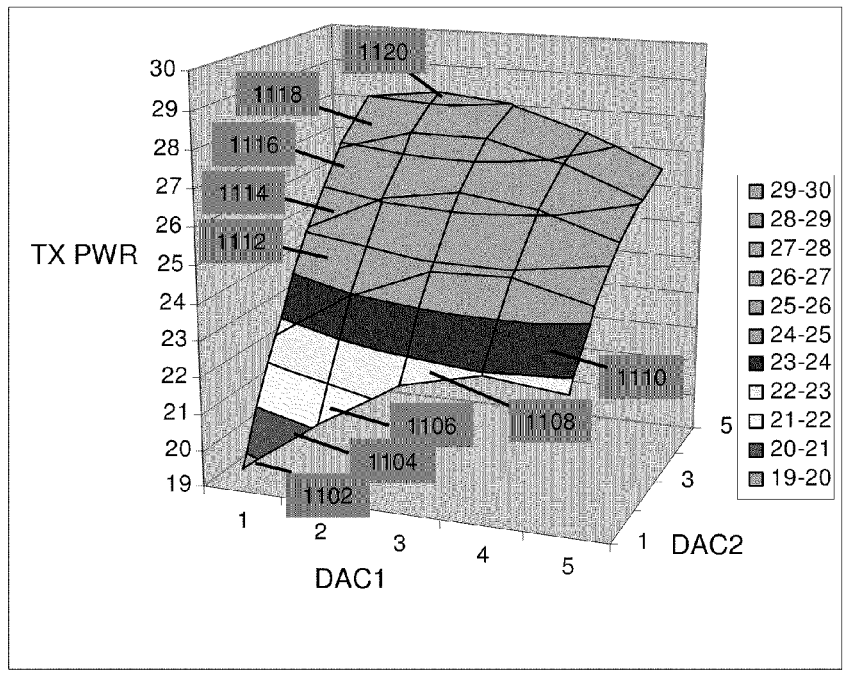
Figure 12:
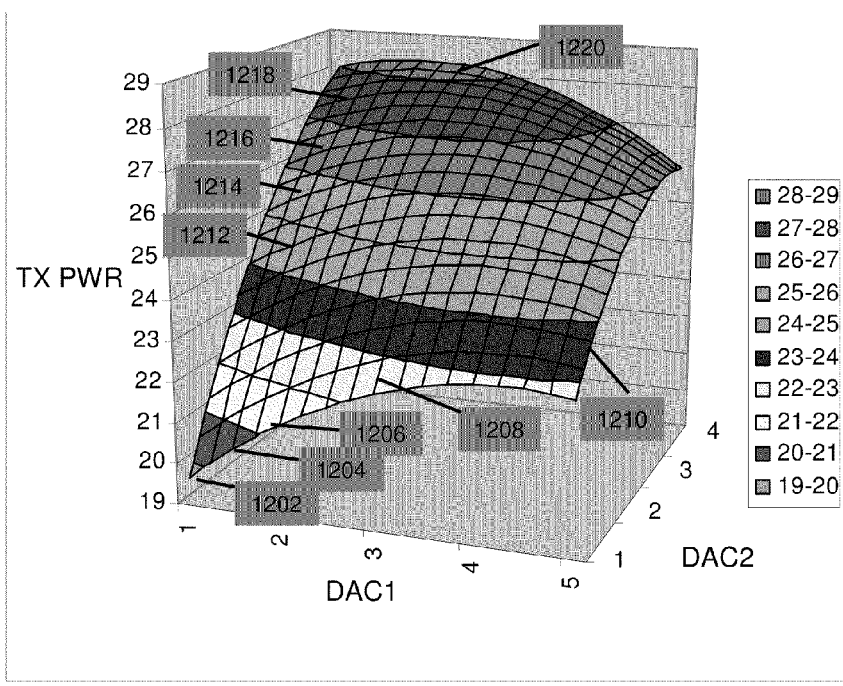

FIG. 11 depicts an illustration of a data set for transmit power measurements performed with the subset of tuning states used in step 802. The 1 dB contour bands 1102-1120 for this illustration are less jagged than the contour bands 902-914 of FIG. 9 because the TX power measurement is derived from the network analyzer which can provide fractional results to the computer 702. FIG. 12 depicts the data set resulting from the application of the above fitting function in step 804. As should be evident in this illustration, the fitting function generates smoother contour bands 1202-1220 when compared to the contour bands 1102-1120 of FIG. 11.

Once the data sets for each performance parameter (e.g., RX sensitivity, TX power, etc.) have been fitted in step 804 over the entire tuning states of DACs 1 and 2, the computer 702 can be adapted with computer software to proceed to step 806 where it can present the designer of the communication device 100 options to define desired figures of merit (FOMs) which can be used to determine tuning states that provide optimal solutions for the desired FOMs. An FOM can represent, for example, a desired power transmit efficiency (TX power over battery power drain). FOMs can also represent "keep out" areas where optimal performance may not be desirable. FOMs can also mathematically combine performance parameters (e.g., TX power+RX power).

Once the designer has defined one or more desirable performance characteristics of the communication device 100 in the form of FOMs, the computer 702 can be adapted in step 808 to find a range of tuning states that achieve the desired FOMs by sweeping with a common mathematical model in fine increments to find global optimal performance with respect to the desired FOMs. The computer 702 can be adapted in step 810 to present the user the range of tuning states that achieve the desired FOMs on a per band and per use case basis. The user can select in step 812 portions of the tuning states for storage in a look-up table which can be utilized by the communication device 100 during operation. FIG. 13 depicts an illustration of a look-up table which can be indexed by the controller 106 of the communication device 100 of FIG. 1 during operation according to band, and use case.

During normal operation by consumers, the communication device 100 can detect a number of possible use cases for the device. For instance, the communication device 100 can detect that the consumer has invoked a call or has answered a called based on the state of call processing software operating in the communication device 100. The call processing software operating in the communication device 100 can also detect which band or sub-band is being used for the active call. The communication device 100 can further detect that a flip housing assembly has been opened with a common electro-mechanical sensor.

The communication device 100 can also detect from the call processing software that a Bluetooth headset feature, and a speakerphone feature are disabled while a communication session is taking place. The communication device 100 can also detect with a common electro-mechanical sensor whether an antenna has been raised or is in the closed position. The communication device 100 can also detect with a proximity sensor and/or an orientation sensor (e.g., an accelerometer) whether the device is near a body part of the user, and whether the device is in a horizontal or vertical position.

There are innumerable detectable use cases that are contemplated by the present disclosure. These detectable states in whole or in part can provide the communication device 100 a means to predict a likelihood of any number of use cases. Once a user case is detected, the communication device 100 can index through the look-up table of FIG. 13 according to the frequency band (or sub-band) and the use case to identify a desirable tuning state of the tunable matching network 202 of FIG. 2 that causes the communication device 100 to operate in a desirable manner contemplated by the designer of said communication device 100.

From the foregoing descriptions, it would be evident to an artisan with ordinary skill in the art that the aforementioned embodiments can be modified, reduced, or enhanced without departing from the scope and spirit of the claims described below. For example, FIGS. 1-7 and method 800 of FIG. 8 can be adapted to be used for calibrating a tunable matching network of a wireline transceiver. Method 800 can be applied to innumerable combinations of use cases, bands, sub-sets of bands, and other performance parameters which have not been addressed in the present disclosure. These undisclosed combinations are contemplated by the present disclosure.

Other suitable modifications can be applied to the present disclosure. Accordingly, the reader is directed to the claims for a fuller understanding of the breadth and scope of the present disclosure.

Figure 14:
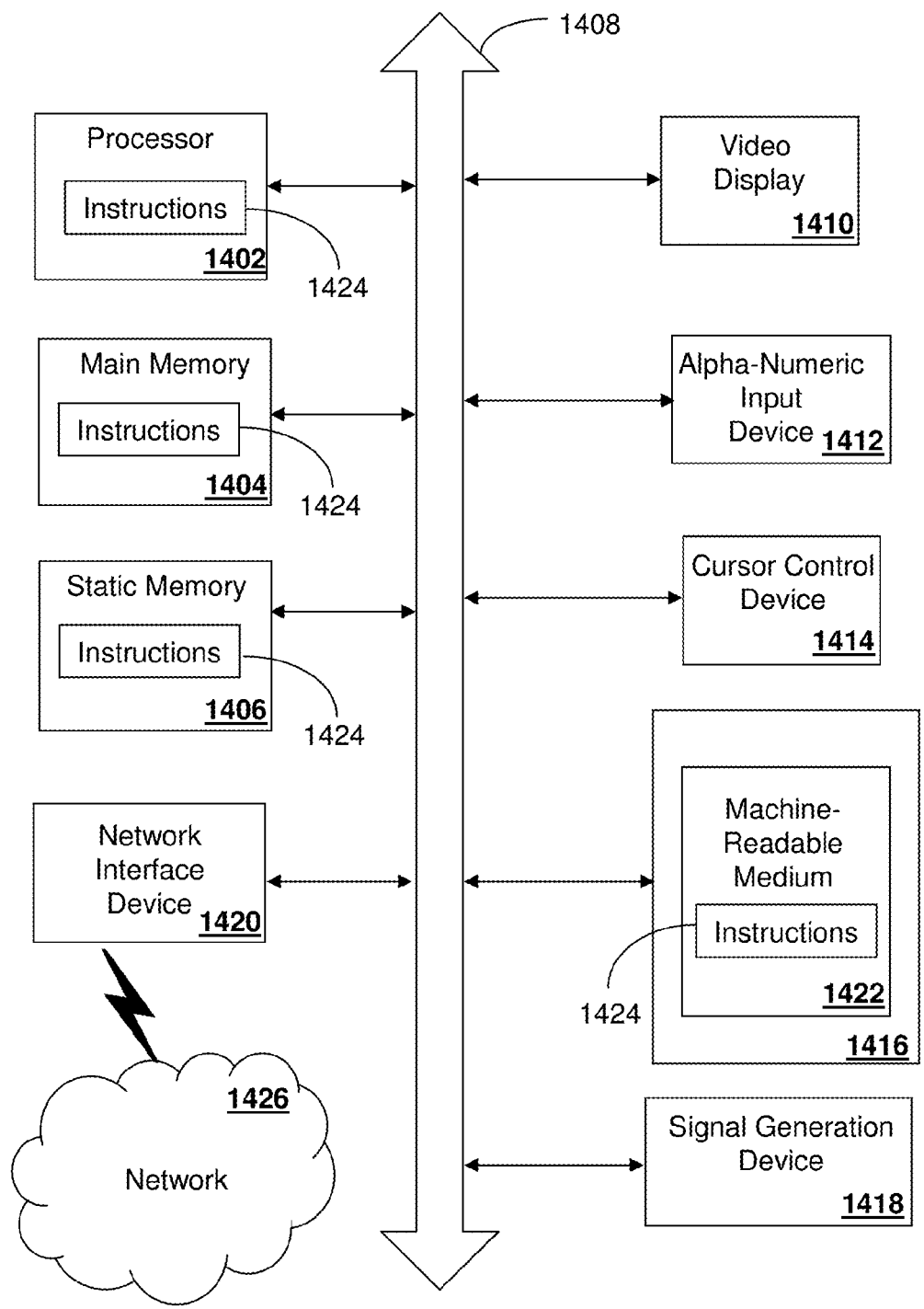
FIG. 14 depicts an exemplary diagrammatic representation of a machine in the form of a computer system within which a set of instructions, when executed, may cause the machine to perform any one or more of the methodologies disclosed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    selecting a subset of tuning states of a tunable matching network coupled to an antenna of a communication device, wherein the tunable matching network has a tunable reactance that affects a plurality of performance parameters of the communication device, wherein the plurality of performance parameters are associated with a receive mode and a transmit mode of the communication device;
    performing actual measurements of the plurality of performance parameters of the communication device according to the subset of tuning states;
    determining estimated measurements of the plurality of performance parameters for a portion of the tuning states not included in the subset of tuning states according to regression analysis of the actual measurements of the plurality of performance parameters;
    identifying a data set for each of the plurality of performance parameters from the tuning states and the actual and estimated measurements; and
    determining from at least a portion of the plurality of data sets one or more tuning states of the tunable matching network that achieves a performance characteristic of the communication device.

2. The method of claim 1, wherein each of the data sets has at least two independent variables, and wherein the plurality of performance parameters include at least one of transmitter power, transmitter efficiency, receiver sensitivity, power consumption of the communication device, a specific absorption rate, total radiated power, total isotropic sensitivity or radiated harmonics measurements.

3. The method of claim 2, wherein the at least two independent variables correspond to a combination of at least portions of the tuning states.

4. The method of claim 1, wherein the tunable matching network comprises at least one of a first tunable reactance circuit having at least one tunable reactive element, or a second tunable reactance circuit having at least one switchable element that enables or disables at least one fixed reactance element, and wherein the one or more tuning states determined from the at least a portion of the plurality of data sets does not optimize the performance characteristic.

5. The method of claim 4, wherein the at least one tunable reactive element comprises at least one of a first circuit element with a tunable capacitance or a second circuit element a tunable inductance, and wherein the at least one fixed reactance element comprises at least one of a third circuit element with a fixed capacitance, or a fourth circuit element with a fixed inductance.

6. The method of claim 1, wherein the determined tuning states are stored in a look-up table of the communication device, wherein the look-up table is used by the communication device to tune the tunable matching network, and wherein the performance characteristic is a combination of transmit power and receive power.

7. The method of claim 1, wherein identifying the data set for each of the plurality performance parameters comprises identifying two or more data sets, and wherein the method further comprises determining the one or more tuning states of the tunable matching network that achieves the performance characteristic of the communication device according to a combination of at least portions of the two or more data sets.

8. The method of claim 6, wherein the performance characteristic of the communication device comprise one or more corresponding desirable values of the plurality of performance parameters.

9. The method of claim 1, comprising identifying at least a subset of the one or more tuning states that achieves the performance characteristic of the communication device.

10. The method of claim 9, wherein the subset of the one or more tuning states are storable in a look-up table which can be used by the communication device to control the tunable matching network.

11. The method of claim 1, wherein the communication device is operable at a plurality of frequency bands and a plurality of use cases, and wherein at least a portion of the method is applied to each of the plurality of frequency bands and to each of the plurality of use cases.

12. The method of claim 11, wherein the plurality of use cases are determined from a plurality of operational states of the communication device.

13. The method of claim 12, wherein the plurality of operational states correspond to at least two of a group of operational states comprising a state of use of the antenna of the communication, a state of use of a speakerphone feature of the communication, a state of use of a multi-configurable housing assembly of the communication device, a state of use of a hands-free feature of the communication device, and a state of a detectable proximity of a user to the communication device.

14. The method of claim 11, comprising identifying at least subsets of the one or more tuning states categorized by frequency bands and use cases.

15. The method of claim 14, wherein the subsets of the one or more tuning states categorized by frequency bands or use cases are storable in a look-up table which can be used by the communication device to control the tunable matching network.

16. The method of claim 1, comprising determining the estimated measurements according to regression analysis of the actual measurements.

17. A non-transitory computer-readable storage medium, comprising computer instructions, which when executed by a processor cause the processor to perform operations comprising:
performing actual measurements of one or more performance parameters of a communication device according to a subset of tuning states of a tunable matching network operable in a communication device, wherein the one or more performance parameters are associated with a receive mode and a transmit mode of the communication device;
determining estimated measurements of the one or more performance parameters of the communication device for a portion of the tuning states not included in the subset of tuning states according to a regression analysis of the actual measurements;
identifying a data set for each of the one or more performance parameters from at least portions of the tuning states and the actual and estimated measurements; and
determining from at least a portion of the data sets one or more tuning states that achieve a performance characteristic of the communication device.

18. The non-transitory storage medium of claim 17, wherein each of the data sets has at least two independent variables.

19. The non-transitory storage medium of claim 17, wherein the tunable matching network comprises at least one of a first tunable reactance circuit having at least one tunable reactive element, or a second tunable reactance circuit having at least one switchable element that enables or disables at least one fixed reactance element.

20. The non-transitory storage medium of claim 17, wherein the performance characteristic comprises a combination of at least two performance parameters of the communication device when the communication device has more than one performance parameter.

21. The non-transitory storage medium of claim 17, wherein at least a subset of the one or more tuning states are storable in a look-up table which can be used by the communication device to control the tunable matching network.

22. The non-transitory storage medium of claim 17, wherein the communication device is operable at a plurality of frequency bands and a plurality of use cases, and wherein determining the one or more tuning states comprises determining the one or more tuning states to achieve the performance characteristic according to each of the plurality of frequency bands and each of the plurality of use cases.

23. The non-transitory storage medium of claim 22, wherein the processor further performs operations comprising identifying at least subsets of the one or more tuning states categorized by frequency bands and use cases, which are storable in a look-up table which can be used by the communication device to control the tunable matching network.

24. The non-transitory storage medium of claim 17, wherein the look-up table is used by the communication device to tune the tunable matching network.

25. The non-transitory storage medium of claim 17, wherein the one or more performance parameters comprise at least one of a power consumption of the communication device, radiated power of a transmitter of the communication device, or receive sensitivity of a receiver of the communication device.

26. The non-transitory storage medium of claim 17, wherein the communication device comprises one of a wireless communication device, or a wireline communication device.

27. A method, comprising:
performing actual measurements of one or more performance parameters of a communication device according to a subset of tuning states of a tunable reactive element of a communication device, wherein the one or more performance parameters are associated with a receive mode and a transmit mode of the communication device;
estimating measurements of the of the one or more performance parameters for a portion of the tuning states not included in the subset of tuning states according to regression analysis applied to at least portions of the actual measurements; and
determining a multi-dimensional data set for each of the one or more performance parameters from at least portions of the tuning states and the actual and estimated measurements.

28. The method of claim 27, wherein the regression analysis is of a fourth order, and wherein the method further comprises:
determining one or more tuning states that achieve a performance characteristic of the communication device; and
presenting at a user interface the one or more tuning states to enable selection of at least a subset of the one or more tuning states for storage in a look-up table which can be used by the communication device for tuning the tunable reactive element while the communication device is in operation.

29. A device, comprising:
a memory to store instructions; and
a processor coupled to the memory, wherein execution of the instructions by the processor causes the processor to perform operations comprising:
selecting a subset of tuning states of a tunable matching network coupled to an antenna of a communication device, wherein the tunable matching network has a tunable reactance that affects one or more performance parameters of the communication device, wherein the one or more performance parameters are associated with a receive mode and a transmit mode of the communication device;
performing actual measurements of one or more performance parameters of the communication device according to a subset of tuning states of the tunable matching network;
determining estimated measurements of the one or more performance parameters of the communication device for a portion of the tuning states not included in the subset of tuning states according to regression analysis of the actual measurements;
identifying a data set for each of the one or more performance parameters from at least portions of the tuning states and the actual and estimated measurements; and
determining from at least a portion of the date sets the tuning states that achieve the at least one desirable performance characteristic of the communication device.

30. The communication device of claim 29, wherein the regression analysis is of a fourth order, and wherein the tunable matching network comprises least one of a first tunable reactance circuit having at least one tunable reactive element, or a second tunable reactance circuit having at least one switchable element that enables or disables at least one fixed reactance element.

* * * * *